United States Patent [19]
Schwarz

[11] Patent Number: 6,048,388
[45] Date of Patent: Apr. 11, 2000

[54] INK COMPOSITIONS CONTAINING IONIC LIQUID SOLVENTS

[76] Inventor: William M. Schwarz, 274 Southboro Dr., Webster, N.Y. 14580

[21] Appl. No.: 09/106,396

[22] Filed: Jun. 29, 1998

[51] Int. Cl.[7] .................................................. C09D 11/02
[52] U.S. Cl. ...................... 106/31.27; 106/31.43; 106/31.47; 106/31.49; 106/31.6; 106/31.77; 106/31.75; 106/31.78
[58] Field of Search .............................. 106/31.27, 31.43, 106/31.47, 31.49, 31.6, 31.75, 31.77, 31.78

[56] References Cited

U.S. PATENT DOCUMENTS

| | | | |
|---|---|---|---|
| 5,061,316 | 10/1991 | Moffatt | 106/31.27 |
| 5,062,892 | 11/1991 | Halko | 106/31.27 |
| 5,106,416 | 4/1992 | Moffatt et al. | 106/31.27 |
| 5,116,409 | 5/1992 | Moffatt | 106/31.27 |
| 5,220,346 | 6/1993 | Carreira et al. | 106/31.27 |
| 5,488,402 | 1/1996 | Shields et al. | 347/96 |
| 5,518,534 | 5/1996 | Pearstine et al. | 106/31.6 |
| 5,563,644 | 10/1996 | Isganitits et al. | 347/102 |
| 5,766,326 | 6/1998 | Gundlach et al. | 106/31.47 |
| 5,853,469 | 12/1998 | Colt et al. | 106/31.49 |

OTHER PUBLICATIONS

Freemantle, "Designer Solvents", Mar. 30, 1998, C&EN, pp. 32–37.

*Primary Examiner*—Helene Klemanski
*Attorney, Agent, or Firm*—Judith L. Byorick

[57] ABSTRACT

Disclosed is an ink composition which comprises water, a colorant, and an ionic liquid material. In a preferred embodiment, the ink is substantially free of organic solvents. Also disclosed is a process which comprises incorporating the ink composition into an ink jet printing apparatus and causing droplets of the ink composition to be ejected in an imagewise pattern onto a substrate.

26 Claims, No Drawings

INK COMPOSITIONS CONTAINING IONIC LIQUID SOLVENTS

BACKGROUND OF THE INVENTION

The present invention is directed to aqueous ink compositions. More specifically, the present invention is directed to ink compositions particularly suitable for use in ink jet printing processes. One embodiment of the present invention is directed to an ink composition which comprises water, a colorant, and an ionic liquid material.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin,* Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It also has been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (1 May 1989) and references therein, the disclosure of which is totally incorporated herein by reference.

"Designer Solvents," M. Freemantle, Chemical and Engineering News (Mar. 30, 1998), the disclosure of which is totally incorporated herein by reference, discloses ionic systems consisting of salts that are liquid at ambient temperatures that can act as solvents for a broad spectrum of chemical processes and which in some cases can serve as both catalyst and solvent.

Copending application U.S. Ser. No. 09/106,391; entitled "Ink Compositions Containing Oxy Acids or Oxy Acid Salts," with the named inventor William M. Schwarz, filed concurrently herewith, the disclosure of which is totally incorporated herein by reference, discloses an ink composition which comprises (1) water; (2) a colorant; and (3) an additive selected from the group consisting of oxy acids, oxy acid salts, and mixtures thereof. Also disclosed is a thermal ink jet printing process employing the ink.

Copending application U.S. Ser. No. 09/106,527; entitled "Inks for Ink Jet Printing With Reduced Intercolor Bleed," with the named inventor William M. Schwarz, filed concurrently herewith, the disclosure of which is totally incorporated herein by reference, discloses an ink composition which comprises water, an anionic dye, and a monoquaternary cationic penetrant of the formula

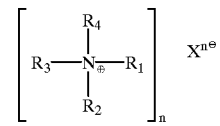

wherein $R_1$ is either a benzyl group or an alkyl group having at least about 3 carbon atoms, $R_2$, $R_3$, and $R_4$ each, independently of the others, are hydrogen atoms, methyl groups, or ethyl groups, wherein two or more R groups can be joined together to form a ring, X is an anion, and n is an integer representing the charge on the anion, wherein the ink exhibits rapid penetration when applied to plain paper. Also disclosed is a set of inks for generating multicolored images which comprises (a) a first ink as described above; and (b) a second ink comprising water and a pigment; wherein intercolor bleed between the first ink and the second ink is reduced. Further disclosed are ink jet printing processes with the ink and ink set described above.

Copending application U.S. Ser. No. 09/106,621; entitled "Ink Compositions Substantially Free of Organic Liquids," with the named inventors Kurt B. Gundlach, Maura A. Sweeney, Luis A. Sanchez, Richard L. Colt, and Melvin D. Croucher, filed concurrently herewith, the disclosure of which is totally incorporated herein by reference, discloses an ink composition which comprises water, an acid dye, a monovalent salt, a polyquaternary amine compound, and an optional surfactant, said ink being substantially free of organic solvents. The ink is particularly suitable for applications such as ink jet printing and marking pens. The disclosed inks in some embodiments are substantially indelible. Also disclosed is a composition for removing the ink compositions from substrates to which they have been applied which comprises water and a dianionic surfactant, optionally further containing a salt, urea, and/or a viscosity building agent such as a gum.

While known compositions and processes are suitable for their intended purposes, a need remains for improved ink compositions, particularly those suitable for use in ink jet printing. In addition, a need remains for ink compositions which exhibit desirable interactions with paper and other printing substrates. Further, a need remains for ink compositions which exhibit improved MFLEN and reduced feathering and edge raggedness. Additionally, a need remains for ink compositions which exhibit improved solubility of dye colorants and other ink ingredients therein. There is also a need for ink compositions which exhibit good latency. In addition, there is a need for ink compositions which exhibit reduced intercolor bleed when different colored inks are printed adjacent to each other or on top of each other. Further, there is a need for ink compositions containing improved humectants. Additionally, there is a need for ink compositions which exhibit good heat stability. A need also remains for ink compositions which can contain relatively high dye concentrations. In addition, a need remains for ink compositions which exhibit desirable interactions between the humectant and the colorant. Further, a need remains for ink compositions which enable formation of permanent images. Additionally, a need remains for ink compositions containing organic components which do not precipitate other ink ingredients.

SUMMARY OF THE INVENTION

It is an object of the present invention to provide ink compositions with the above noted advantages.

It is another object of the present invention to provide improved ink compositions, particularly those suitable for use in ink jet printing.

It is yet another object of the present invention to provide ink compositions which exhibit desirable interactions with paper and other printing substrates.

It is still another object of the present invention to provide ink compositions which exhibit improved MFLEN and reduced feathering and edge raggedness.

Another object of the present invention is to provide ink compositions which exhibit improved solubility of dye colorants and other ink ingredients therein.

Yet another object of the present invention is to provide ink compositions which exhibit good latency.

Still another object of the present invention is to provide ink compositions which exhibit reduced intercolor bleed when different colored inks are printed adjacent to each other or on top of each other.

It is another object of the present invention to provide ink compositions containing improved humectants.

It is yet another object of the present invention to provide ink compositions which exhibit good heat stability.

It is still another object of the present invention to provide ink compositions which can contain relatively high dye concentrations.

Another object of the present invention is to provide ink compositions which exhibit desirable interactions between the humectant and the colorant.

Yet another object of the present invention is to provide ink compositions which enable formation of permanent images.

Still another object of the present invention is to provide ink compositions containing organic components which do not precipitate other ink ingredients.

These and other objects of the present invention (or specific embodiments thereof) can be achieved by providing an ink composition which comprises water, a colorant, and an ionic liquid material.

DETAILED DESCRIPTION OF THE INVENTION

Ink compositions of the present invention comprise an aqueous liquid vehicle, a colorant, and an ionic liquid material. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant which has a boiling point higher than that of water (100° C.). The liquid vehicle is typically present in an amount of from about 80 to about 99.9 percent by weight of the ink, and preferably from about 90 to about 99 percent by weight of the ink, although the amount can be outside these ranges.

In one embodiment of the present invention, the inks of the present invention are substantially free of organic solvents, by which is meant that the ink is substantially free of all organic cosolvents, humectants, penetrants, or other materials (other than the ionic liquid itself and any optional surfactant components of the ink) which in their pure form are liquid at about 30° C. and about 1 atmosphere of pressure. The ionic liquid performs these functions conventionally performed by organic cosolvents. In many instances, fluid, nonpolar solvents or cosolvents commonly used in ink jet inks, such as sulfolane, N-methyl pyrrolidinone, or the like, can have a tendency to feather on many types of papers. The presence of more viscous, hydrogen bonded solvents or cosolvents commonly used in ink jet inks, such as ethylene glycol and the like, can give somewhat sharper line edges, and the use of strong penetrants and/or reacting agents can have a marked effect on line edges and act to obliterate the natural tendencies of ink cosolvents to feather. Nevertheless, it is believed that better edge sharpness (MFLEN) can be obtained if nonpolar solvents are avoided.

Ink compositions of the present invention also include a colorant. Dyes are suitable colorants for the inks of the present invention. Any suitable dye or mixture of dyes compatible with the ink liquid vehicle can be used, with water soluble anionic dyes and cationic dyes being preferred. Examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7,9, 24, 26, 48, 52, 58, 60, 61, 63, 92, 107, 109, 118, 119, 131, 140,155,156,172,194, and the like), Acid Red dyes (No. 1, 8, 32, 35, 37, 52, 57, 92, 115, 119, 154, 249, 254, 256, and the like), Acid Blue dyes (No. 1, 7,9, 25, 40, 45, 62, 78, 80,92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2,16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Basic Yellow dyes (No. 17, 21, 51, and the like), Basic Red dyes (No. 1, 2, 5, 9, 29, and the like), Basic Blue dyes (No. 6, 7, 9, 11, 12, 16, 17, 24, 26, 41, 47, 66, and the like); anthraquinone dyes, monoazo dyes, disazo dyes, phthalocyanine derivatives, including various phthalocyanine sulfonate salts, aza[18]annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-175; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Clariant Corp., Charlotte, N.C., such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), various Reactive dyes, including Reactive Black dyes, Reactive Blue dyes, Reactive Red dyes, Reactive Yellow dyes, Disperse dyes, Spirit Soluble dyes, and the like, as well as mixtures thereof. The dye is present in the ink composition in any effective amount, typically from about 0.5 to about 15 percent by weight, and preferably from about 1 to about 10 percent by weight, although the amount can be outside of these ranges.

Also suitable as a colorant are pigment particles. The pigment can be of any desired color, such as black, cyan, magenta, yellow, red, blue, green, brown, or the like, as well as mixtures thereof. Examples of suitable pigments include various carbon blacks such as channel black, furnace black, lamp black, Raven® 5250, Raven® 5750, Raven® 3500 and other similar carbon black products available from Columbia Company, Regal® 330, Black Pearl® L, Black Pearl® 1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue2G (Pigment Blue 15:3), Hostafine® Black T (Pigment Black 7), and Hostafine® Black TS (Pigment Black 7), available from Clariant Corp., Charlotte, N.C., Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (Clariant Corp., Charlotte, NC), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Clariant Corp., Charlotte, N.C.), Permanent Yellow YE 0305 (Paul Uhlich), Lumogen Yellow D0790 (BASF), Suco-Gelb L1250 (BASF), Suco-Yellow D1355 (BASF), Hostaperm Pink E (Clariant Corp., Charlotte, NC), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871 K (BASF), Paliogen Red 3340 (BASF), and Lithol Fast Scarlet L4300 (BASF). Other pigments can also be selected. The pigment particles can be of any desired size. Typical average particle diameters for pigment particles in inks to be used in thermal ink jet printing processes, for example, are from about 0.001 to about 10 microns, preferably from about 0.01 to about 3 microns, and more preferably less than about 1 micron, although the average particle diameter can be outside these ranges. The pigment particles can be present in the ink in any desired amount. Typically the pigment particles are present in an amount of from about 1 to about 20 percent by weight, preferably from about 1 to about 10 percent by weight, more preferably from about 2 to about 8 percent by weight, and even more preferably from about 4 to about 7 percent by weight, although the amount can be outside these ranges.

Mixtures of one or more dyes and/or one or more pigments can also be employed for the colorant component of the inks of the present invention.

The inks of the present invention also contain an ionic liquid. An ionic liquid is defined as a nonpolymeric material that in its substantially pure form is a liquid at about 40° C. and about 1 atmosphere of pressure and has a molecular structure comprising a cation ionically associated with an anion. By "substantially pure" is meant that the ionic material can contain small amounts of water; ionic liquids are highly hygroscopic, and removing residual water therefrom can be difficult; the presence of water can lower the melting point of the ionic liquid further, and ionic liquids containing small amounts of water which are liquid at about 40° C. are included within the scope of the present invention. Ionic liquids are low melting nonpolymeric salts that are reasonably fluid at room temperature, have negligible vapor pressure at about 25° C., and often have a liquid range in excess of 300° C. They also have a wide range of miscibilities with organic solvents, good solvation properties, and high conductivity. In general, ionic liquids exhibit mixed organic and inorganic character.

Structurally, ionic liquids most commonly contain a heterocyclic, organic cation, such as an imidazolium cation, including materials of the general formula

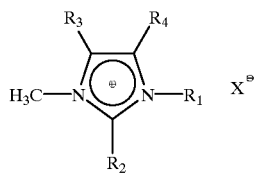

wherein $R_1$ is an alkyl group, preferably with from 1 to about 18 carbon atoms, more preferably with from 1 to about 12 carbon atoms, even more preferably with from 1 to about 5 carbon atoms, and still more preferably with from 1 to about 4 carbon atoms, although the number of carbon atoms can be outside of these ranges, $R_2$, $R_3$, and $R_4$ each, independently of the others, are hydrogen atoms or alkyl groups, preferably with from 1 to about 5 carbon atoms, and more preferably with from 1 to about 4 carbon atoms, and X is an anion, with specific examples including 1-butyl-3-methylimidazolium salts, of the formula

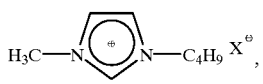

1-ethyl-3-methylimidazolium salts, of the formula

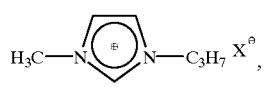

a pyrazolium cation, including materials of the general formula

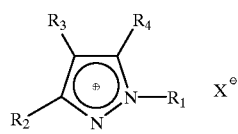

wherein $R_1$ is an alkyl group, preferably with from 1 to about 18 carbon atoms, more preferably with from 1 to about 12 carbon atoms, even more preferably with from 1 to about 5 carbon atoms, and still more preferably with from 1 to about 4 carbon atoms, although the number of carbon atoms can be outside of these ranges, $R_2$, $R_3$, and $R_4$ each, independently of the others, are hydrogen atoms or alkyl groups, preferably with from 1 to about 5 carbon atoms, and more preferably with from 1 to about 4 carbon atoms, and X is an anion, a pyridinium cation, including materials of the general formula

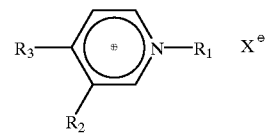

wherein $R_1$ is an alkyl group, preferably with from 1 to about 18 carbon atoms, more preferably with from 1 to about 12 carbon atoms, even more preferably with from 1 to about 5 carbon atoms, and still more preferably with from 1 to about 4 carbon atoms, although the number of carbon atoms can be outside of these ranges, $R_2$ and $R_3$ each, independently of the other, are hydrogen atoms or alkyl groups, preferably with from 1 to about 5 carbon atoms, and more preferably with from 1 to about 4 carbon atoms, and X is an anion, with specific examples including N-butyl pyridinium salts, of the formula

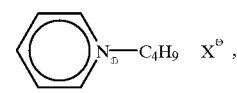

pyrimidinium cations, including materials of the general formulae

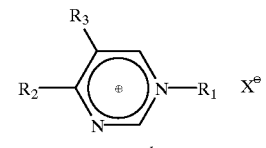

and

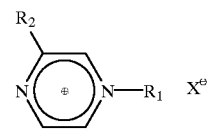

wherein $R_1$ is an alkyl group, preferably with from 1 to about 18 carbon atoms, more preferably with from 1 to about 12 carbon atoms, even more preferably with from 1 to about 5 carbon atoms, and still more preferably with from 1 to about 4 carbon atoms, although the number of carbon atoms can be outside of these ranges, $R_2$ and $R_3$ each, independently of the other, are hydrogen atoms or alkyl groups, preferably with from 1 to about 5 carbon atoms, and more preferably with from 1 to about 4 carbon atoms, and X is an anion, and the like. Tetraalkyl ammonium salts and tetraalkyl phosphonium salts, of the formulae

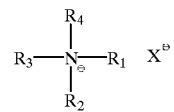

and

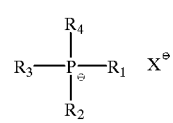

wherein $R_1$, $R_2$, $R_3$, and $R_4$ each, independently of the others, are alkyl groups, preferably with from 1 to about 8 carbon atoms, and more preferably with from 1 to about 4 carbon atoms, although the number of carbon atoms can be outside of these ranges, and X is an anion, are less likely to produce ionic solvents, but some members of these classes are ionic liquids properties similar to those of the cyclic cations.

Any suitable anion can be employed. Preferred anions often have a diffuse charge character, such as tetrafluoborate ($BF_4^-$), nitrate ($NO_3^-$), hexafluorophosphate ($PF_6^-$), perchlorate ($ClO_4^-$), and the like. Ionic solvents can result with other anions, such as chloride, bromide, iodide, acetate, and the like. The organic cations, which are relatively large compared to simple inorganic cations, may account for the low melting point of these salts.

The above materials can be prepared by any desired or suitable method. For example, 1-butyl-3-methylimidazolium fluoborate can be prepared by dissolving 1-butyl-3-methylimidazolium chloride in water and passing the solution through an ion exchange column containing a fluoborate salt, such as sodium fluoborate, to obtain the desired product in water; the water can later be removed by evaporation if desired. 1-Butyl-3-methylimidazolium chloride can be prepared easily by boiling commercially available methylimidazole with 1-chlorobutane, followed by cooling. Similar preparation methods can be employed to form the other ionic liquid compounds.

Additional information about ionic liquids is disclosed in, for example, "Liquid-Crystalline Ionic Liquids," C. J. Bowlas et al., *Chem. Commun.*, Vol. 1996, p. 1625 (1996); "Hydrogen Bonding in Imidazolium Salts and its Implications for Ambient-Temperature Halogenoaluminate(III) Ionic Liquids," A. Elaiwi et al., *J. Chem. Soc. Dalton Trans.*, Vol. 1995, p. 3467 (1995); and "Chemical and Electrical Studies in Room Temperature Aluminum-Halide-Containing Melts," H. L. Chum et al., *Ionic Liquids*, Plenum Press (New York 1981); the disclosures of each of which are totally incorporated herein by reference.

The ionic liquid is present in the ink in any desired or effective amount, typically from about 0.1 to about 90 percent by weight of the ink, preferably from about 10 to about 60 percent by weight of the ink, and more preferably from about 20 to about 50 percent by weight of the ink, although the amount can be outside of these ranges.

Other optional additives to the inks include biocides such as Dowicil 150, 200, and 75, benzoate salts, sorbate salts, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like. One or more surfactants or wetting agents can also be added to the ink. These additives may be of the cationic, anionic, or nonionic types. Suitable surfactants and wetting agents include sodium lauryl sulfate, Tamol® SN, Tamol® LG, those of the Triton® series available from Rohm and Haas Company, those of the Marasperse® series, those of the Igepal® series available from GAF Company, those of the Tergitol® series, and other commercially available surfactants. These surfactants and wetting agents are present in effective amounts, generally from 0 to about 15 percent by weight, and preferably from about 0.01 to about 8 percent by weight, although the amount can be outside of this range.

One example of an additive to the inks is a polymeric additive consisting of two polyalkylene oxide chains bound to a central bisphenol-A-type moiety. This additive is of the formula

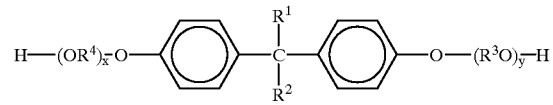

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in Polyethers, N. G. Gaylord, John Wiley & Sons, New York (1963) and "Laboratory Synthesis of Polyethylene Glycol Derivatives," J. M. Harris, *J. Molecular Science—Rev. Mocromol. Chem. Phys.*, C25(3), 325–373 (1985), the disclosures of each of which are totally incorporated herein by reference. The polyalkylene oxide additive is generally present in the ink in an amount of at least about 1 part per million by weight of the ink. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

The ink compositions are generally of a viscosity suitable for use in ink jet printing processes. At room temperature (i.e., about 25° C.), typically, the ink viscosity is no more than about 10 centipoise, and preferably is from about 1 to about 5 centipoise, more preferably from about 1 to about 4 centipoise, although the viscosity can be outside this range, especially for applications such as acoustic ink jet printing.

Ink compositions of the present invention can be of any suitable or desired pH. For some embodiments, such as thermal ink jet printing processes, typical pH values are from about 3 to about 11, preferably from about 5 to about 10, and more preferably from about 6 to about 8.5, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable substrate can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

1-Butyl-3-methylimidazolium chloride is prepared by boiling methylimidazole with 1-chlorobutane, followed by cooling. 1-butyl-3-methylimidazolium tetrafluoborate is then prepared by dissolving the 1-butyl-3-methylimidazolium chloride in water and passing the solution through an ion exchange column containing sodium tetrafluoborate to obtain 1-butyl-3-methylimidazolium tetrafluoborate in water. Water is then removed by evaporation.

An ink composition is prepared by simple mixing of the following ingredients: 1-butyl-3-methylimidazolium tetrafluoborate, 40 percent by weight; BASF X34 dye solution (containing 34 percent by weight dye solids, obtained from BASF), 20 percent by weight; and deionized water, 40 percent by weight. The resulting ink is hand coated onto Xerox® Image Series Smooth paper. It is believed that the resulting images will exhibit good optical density and acceptable drying times, and that the ink will show no signs of dye precipitation after standing for one week under ambient lab conditions.

EXAMPLE II

An ink composition is prepared by simple mixing of the following ingredients: 1-butyl-3-methylimidazolium tetrafluoborate, 40 percent by weight; Acid Yellow 23 dye (Tartrazine), 5 percent by weight; and deionized water, 55 percent by weight. The resulting ink is hand coated onto Xerox® Image Series Smooth paper. It is believed that the resulting images will exhibit good optical density and acceptable drying times, and that the ink will show no signs of dye precipitation after standing for one week under ambient lab conditions.

EXAMPLE III

An ink composition is prepared by simple mixing of the following ingredients: 1-butyl-3-methylimidazolium tetrafluoborate, 21.3 percent by weight; Acid Yellow 23 dye (Tartrazine), 5 percent by weight; and deionized water, balance. The resulting ink is hand coated onto Xerox® Image Series Smooth paper. It is believed that the resulting images will exhibit good optical density and acceptable drying times, and that the ink will show no signs of dye precipitation after standing for one week under ambient lab conditions.

EXAMPLE IV

An ink composition is prepared by simple mixing of the following ingredients: 1-butyl-3-methylimidazolium tetrafluoborate, 18.5 percent by weight; Acid Yellow 23 dye (Tartrazine), 5 percent by weight; and deionized water, balance. The resulting ink is hand coated onto Xerox® Image Series Smooth paper. It is believed that the resulting images will exhibit good optical density and acceptable drying times, and that the ink will show no signs of dye precipitation after standing for one week under ambient lab conditions.

EXAMPLE V

An ink composition is prepared by simple mixing of the following ingredients: 1-butyl-3-methylimidazolium tetrafluoborate, 23.5 percent by weight; Acid Yellow 23 dye (Tartrazine), 5 percent by weight; Nekal BA77 (sodium diisopropyl naphthalene sulfonate, available from GAF, Wayne, N.J.), 4 percent by weight; and deionized water, balance. The resulting ink is hand coated onto Xerox® Image Series Smooth paper. It is believed that the resulting images will exhibit good optical density and acceptable drying times, and that the ink will show no signs of dye precipitation after standing for one week under ambient lab conditions.

EXAMPLE VI

The ink preparation processes of Examples I through V are repeated except that 1-butyl-3-methylimidazolium chloride is substituted for 1-butyl-3-methylimidazolium fluoborate. It is believed that similar results will be observed.

EXAMPLE VII

1-Butyl-3-methylimidazolium bromide is prepared by the method described in Example I except that 1-bromobutane is substituted for 1-chlorobutane. The ink preparation processes of Examples I through V are repeated except that 1-butyl-3-methylimidazolium bromide is substituted for 1-butyl-3-methylimidazolium fluoborate. It is believed that similar results will be observed.

EXAMPLE VIII

1-Butyl-3-methylimidazolium iodide is prepared by the method described in Example I except that 1-iodobutane is substituted for 1-chlorobutane. The ink preparation processes of Examples I through V are repeated except that 1-butyl-3-methylimidazolium iodide is substituted for 1-butyl-3-methylimidazolium fluoborate. It is believed that similar results will be observed.

EXAMPLE IX

1-Butyl-3-methylimidazolium nitrate is prepared by reacting 1-butyl-3-methylimidazolium chloride with silver oxide ($Ag_2O$), thereby converting the chloride compound to 1-butyl-3-methylimidazolium hydroxide. The hydroxide compound thus formed is then neutralized with 1 Molar nitric acid, thereby converting the hydroxide compound to 1-butyl-3-imidazolium nitrate. The ink preparation processes of Examples I through V are repeated except that 1-butyl-3 -methylimidazolium nitrate is substituted for 1-butyl-3-methylimidazolium fluoborate. It is believed that similar results will be observed.

EXAMPLE X

1-Ethyl-3-methylimidazolium chloride is prepared by boiling methylimidazole with chloroethane, followed by cooling. The ink preparation processes of Examples I through V are repeated except that 1-ethyl-3-methylimidazolium chloride is substituted for 1-butyl-3-methylimidazolium fluoborate. It is believed that similar results will be observed.

EXAMPLE XI

1-Ethyl-3-methylimidazolium chloride is prepared as described in Example X. 1-ethyl-3-methylimidazolium tetrafluoborate is then prepared by dissolving the 1-ethyl-3-methylimidazolium chloride in water and passing the solution through an ion exchange column containing sodium tetrafluoborate to obtain 1-ethyl-3-methylimidazolium tetrafluoborate in water. Water is then removed by evaporation. The ink preparation processes of Examples I through V are repeated except that 1-ethyl-3-methylimidazolium tetrafluoborate is substituted for 1-butyl-3-methylimidazolium fluoborate. It is believed that similar results will be observed.

EXAMPLE XII

1-Ethyl-3-methylimidazolium bromide is prepared by the method described in Example X except that 1-bromoethane is substituted for 1-chloroethane. The ink preparation processes of Examples I through V are repeated except that 1-ethyl-3-methylimidazolium bromide is substituted for 1-butyl-3-methylimidazolium fluoborate. It is believed that similar results will be observed.

EXAMPLE XIII

1-Ethyl-3-methylimidazolium iodide is prepared by the method described in Example X except that 1-iodoethane is substituted for 1-chloroethane. The ink preparation processes of Examples I through V are repeated except that 1-ethyl-3-methylimidazolium iodide is substituted for 1-butyl-3-methylimidazolium fluoborate. It is believed that similar results will be observed.

EXAMPLE XIV

1-Ethyl-3-methylimidazolium nitrate is prepared by the method described in Example X except that 1-ethyl-3-methylimidazolium chloride is substituted for 1-butyl-3-methylimidazolium chloride. The ink preparation processes of Examples I through V are repeated except that 1-ethyl-3-methylimidazolium nitrate is substituted for 1-butyl-3-methylimidazolium fluoborate. It is believed that similar results will be observed.

EXAMPLE XV

N-butyl pyridinium chloride is prepared by boiling pyridine with 1-chlorobutane, followed by cooling. The ink preparation processes of Examples I through V are repeated except that N-butyl pyridinium chloride is substituted for 1-butyl-3-methylimidazolium tetrafluoborate. It is believed that similar results will be observed.

EXAMPLE XVI

N-butyl pyridinium chloride is prepared as described in Example XV. N-butyl pyridinium tetrafluoborate is then prepared by dissolving the N-butyl pyridinium chloride in water and passing the solution through an ion exchange column containing sodium tetrafluoborate to obtain N-butyl pyridinium tetrafluoborate in water. Water is then removed by evaporation. The ink preparation processes of Examples I through V are repeated except that N-butyl pyridinium tetrafluoborate is substituted for 1-butyl-3-methylimidazolium tetrafluoborate. It is believed that similar results will be observed.

EXAMPLE XVII

N-butyl pyridinium bromide is prepared as described in Example XV except that 1-bromobutane is substituted for 1-chlorobutane. The ink preparation processes of Examples I through V are repeated except that N-butyl pyridinium bromide is substituted for 1-butyl-3-methylimidazolium tetrafluoborate. It is believed that similar results will be observed.

EXAMPLE XVIII

N-butyl pyridinium iodide is prepared as described in Example XV except that 1-iodobutane is substituted for 1-chlorobutane. The ink preparation processes of Examples I through V are repeated except that N-butyl pyridinium iodide is substituted for 1-butyl-3-methylimidazolium tetrafluoborate. It is believed that similar results will be observed.

EXAMPLE XIX

N-butyl pyridinium nitrate is prepared by reacting N-butyl pyridinium chloride with silver oxide ($Ag_2O$), thereby converting the chloride compound to N-butyl pyridinium hydroxide. The hydroxide compound thus formed is then neutralized with 1 Molar nitric acid, thereby converting the hydroxide compound to N-butyl pyridinium nitrate. The ink preparation processes of Examples I through V are repeated except that N-butyl pyridinium nitrate is substituted for 1-butyl-3-methylimidazolium tetrafluoborate. It is believed that similar results will be observed.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition which comprises water, a colorant, and an ionic liquid material.

2. An ink composition according to claim 1 wherein the ink is substantially free of organic solvents.

3. An ink composition according to claim 1 wherein the ionic liquid material is selected from the group consisting of imidazolium compounds, pyrazolium compounds, pyridinium compounds, pyrimidinium compounds, tetraalkyl ammonium compounds, tetraalkyl phosphonium compounds, and mixtures thereof.

4. An ink composition according to claim 1 wherein the ionic liquid material is selected from the group consisting of:
(a) those of the general formula

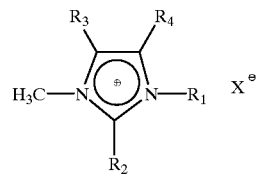

wherein $R_1$ is an alkyl group, $R_2$, $R_3$, and $R_4$ each, independently of the others, are hydrogen atoms or alkyl groups, and X is an anion; (b) those of the general formula

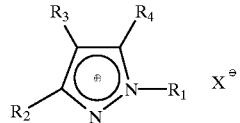

wherein $R_1$ is an alkyl group, $R_2$, $R_3$, and $R_4$ each, independently of the others, are hydrogen atoms or alkyl groups, and X is an anion; (c) those of the general formula

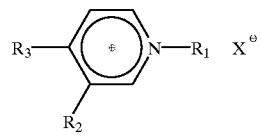

wherein $R_1$ is an alkyl group, $R_2$ and $R_3$ each, independently of the other, are hydrogen atoms or alkyl groups, and X is an anion; (d) those of the general formula

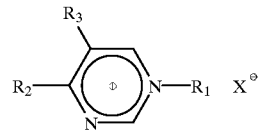

wherein $R_1$ is an alkyl group, $R_2$ and $R_3$ each, independently of the other, are hydrogen atoms or alkyl groups, and X is an anion; (e) those of the general formula

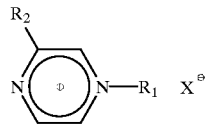

wherein $R_1$ is an alkyl group, $R_2$ is a hydrogen atom or an alkyl group, and X is an anion; (f) those of the general formula

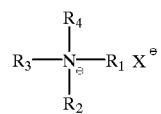

wherein $R_1$, $R_2$, $R_3$, and $R_4$ each, independently of the others, are alkyl groups, and X is an anion; (g) those of the general formula

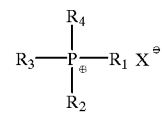

wherein $R_1$, $R_2$, $R_3$, and $R_4$ each, independently of the others, are alkyl groups, and X is an anion; and (h) mixtures thereof.

5. An ink composition according to claim 1 wherein the ionic liquid material is selected from the group consisting of 1-butyl-3-methylimidazolium salts, 1-ethyl-3-methylimidazolium salts, N-butyl pyridinium salts, and mixtures thereof.

6. An ink composition according to claim 1 wherein the ink contains the ionic liquid in an amount of from about 0.1 to about 90 percent by weight of the ink.

7. An ink composition according to claim 1 wherein the ink contains the ionic liquid in an amount of from about 10 to about 60 percent by weight of the ink.

8. An ink composition according to claim 1 wherein the colorant is a dye.

9. An ink composition according to claim 1 wherein the colorant is a pigment.

10. An ink composition according to claim 1 wherein the ionic liquid material has an anion selected from the group consisting of tetrafluoborate, nitrate, hexafluorophosphate, perchlorate, and mixtures thereof.

11. An ink composition according to claim 1 wherein the ionic liquid material is selected from the group consisting of imidazolium compounds, pyrazolium compounds, pyridinium compounds, pyrimidinium compounds, tetraalkyl ammonium compounds, tetraalkyl phosphonium compounds, and mixtures thereof and the ionic liquid material has an anion selected from the group consisting of tetrafluoborate, nitrate, hexafluorophosphate, perchlorate, and mixtures thereof.

12. An ink composition according to claim 1 wherein the ionic liquid material is selected from the group consisting of 1-butyl-3-methylimidazolium salts, 1-ethyl-3-methylimidazolium salts, N-butyl pyridinium salts, and mixtures thereof and the ionic liquid material has an anion selected from the group consisting of tetrafluoborate, nitrate, hexafluorophosphate, perchlorate, and mixtures thereof.

13. An ink composition according to claim 1 wherein the ionic liquid material is selected from the group consisting of 1-butyl-3-methylimidazolium tetrafluoborate, 1-butyl-3-methylimidazolium chloride, 1-butyl-3-methylimidazolium bromide, 1-butyl-3-methylimidazolium iodide, 1-butyl-3-methylimidazolium nitrate, 1-ethyl-3-methylimidazolium chloride, 1-ethyl-3-methylimidazolium tetrafluoborate, 1-ethyl-3-methylimidazolium bromide, 1-ethyl-3-methylimidazolium iodide, 1-ethyl-3-methylimidazolium nitrate, N-butyl pyridinium chloride, N-butyl pyridinium tetrafluoborate, N-butyl pyridinium bromide, N-butyl pyridinium iodide, and N-butyl pyridinium nitrate.

14. A process which comprises incorporating the ink composition of claim 1 into an ink jet printing apparatus and causing droplets of the ink composition to be ejected in an imagewise pattern onto a substrate.

15. A process according to claim 14 wherein the printing apparatus employs a thermal ink jet process wherein the ink in the nozzles is selectively heated in an imagewise pattern, thereby causing droplets of the ink to be ejected in imagewise pattern.

16. A process according to claim 14 wherein the ink is substantially free of organic solvents.

17. A process according to claim 14 wherein the ionic liquid material is selected from the group consisting of imidazolium compounds, pyrazolium compounds, pyridinium compounds, pyrimidinium compounds, tetraalkyl ammonium compounds, tetraalkyl phosphonium compounds, and mixtures thereof.

18. A process according to claim 14 wherein the ionic liquid material is selected from the group consisting of: (a) those of the general formula

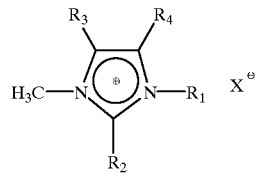

wherein $R_1$ is an alkyl group, $R_2$, $R_3$, and $R_4$ each, independently of the others, are hydrogen atoms or alkyl groups, and X is an anion; (b) those of the general formula

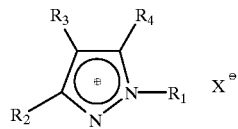

wherein $R_1$ is an alkyl group, $R_2$, $R_3$, and $R_4$ each, independently of the others, are hydrogen atoms or alkyl groups, and X is an anion; (c) those of the general formula

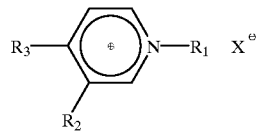

wherein $R_1$ is an alkyl group, $R_2$ and $R_3$ each, independently of the other, are hydrogen atoms or alkyl groups, and X is an anion; (d) those of the general formula

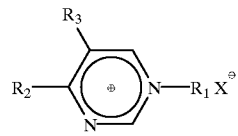

wherein $R_1$ is an alkyl group, $R_2$ and $R_3$ each, independently of the other, are hydrogen atoms or alkyl groups, and X is an anion; (e) those of the general formula

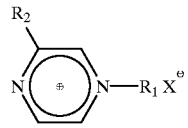

wherein $R_1$ is an alkyl group, $R_2$ is a hydrogen atom or an alkyl group, and X is an anion; (f) those of the general formula

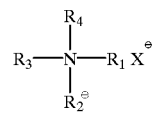

wherein $R_1$, $R_2$, $R_3$, and $R_4$ each, independently of the others, are alkyl groups, and X is an anion; (g) those of the general formula

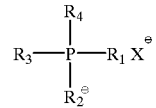

wherein $R_1$, $R_2$, $R_3$, and $R_4$ each, independently of the others, are alkyl groups, and X is an anion; and (h) mixtures thereof.

19. A process according to claim 14 wherein the ionic liquid material is selected from the group consisting of 1-butyl-3-methylimidazolium salts, 1-ethyl-3-methylimidazolium salts, N-butyl pyridinium salts, and mixtures thereof.

20. A process according to claim 14 wherein the ink contains the ionic liquid in an amount of from about 0.1 to about 90 percent by weight of the ink.

21. A process according to claim 14 wherein the ink contains the ionic liquid in an amount of from about 10 to about 60 percent by weight of the ink.

22. A process which comprises incorporating the ink composition of claim 10 into an ink jet printing apparatus and causing droplets of the ink composition to be ejected in an imagewise pattern onto a substrate.

23. A process according to claim 22 wherein the printing apparatus employs a thermal ink jet process wherein the ink in the nozzles is selectively heated in an imagewise pattern, thereby causing droplets of the ink to be ejected in imagewise pattern.

24. An ink composition which comprises water, a colorant, and an ionic liquid material, wherein the ionic liquid material is selected from the group consisting of: (a) those of the general formula

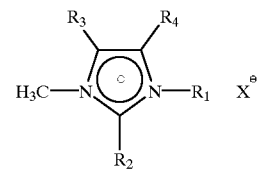

wherein $R_1$ is an alkyl group, $R_2$, $R_3$, and $R_4$ each, independently of the others, are hydrogen atoms or alkyl groups, and X is an anion; (b) those of the general formula

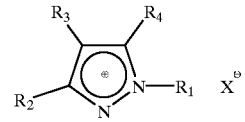

wherein $R_1$ is an alkyl group, $R_2$, $R_3$, and $R_4$ each, independently of the others, are hydrogen atoms or alkyl groups, and X is an anion; (c) those of the general formula

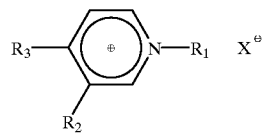

wherein $R_1$ is an alkyl group, $R_2$ and $R_3$ each, independently of the other, are hydrogen atoms or alkyl groups, and X is an anion; (d) those of the general formula

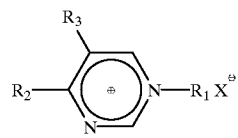

wherein $R_1$ is an alkyl group, $R_2$ and $R_3$ each, independently of the other, are hydrogen atoms or alkyl groups, and X is an anion; (e) those of the general formula

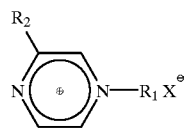

wherein $R_1$ is an alkyl group, $R_2$ is a hydrogen atom or an alkyl group, and X is an anion; (f) those of the general formula

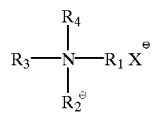

wherein $R_1$, $R_2$, $R_3$, and $R_4$ each, independently of the others, are alkyl groups, and X is an anion; (g) those of the general formula

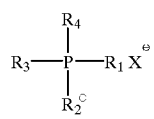

wherein $R_1$, $R_2$, $R_3$, and $R_4$ each, independently of the others, are alkyl groups, and X is an anion; and (h) mixtures thereof, wherein the anion is selected from the group consisting of tetrafluoborate, nitrate, hexafluorophosphate, perchlorate, and mixtures thereof.

25. A process which comprises incorporating into an ink jet printing apparatus an ink composition which comprises water, a colorant, and an ionic liquid material and causing droplets of the ink composition to be ejected in an imagewise pattern onto a substrate, wherein the printer employs an acoustic ink jet process, wherein droplets of the ink are caused to be ejected in imagewise pattern by acoustic beams.

26. A process which comprises incorporating into an ink jet printing apparatus an ink composition which comprises water, a colorant, and an ionic liquid material and causing droplets of the ink composition to be ejected in an imagewise pattern onto a substrate, wherein the ionic liquid material is selected from the group consisting of: (a) those of the general formula

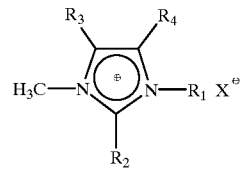

wherein $R_1$ is an alkyl group, $R_2$, $R_3$, and $R_4$ each, independently of the others, are hydrogen atoms or alkyl groups, and X is an anion; (b) those of the general formula

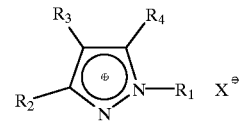

wherein $R_1$ is an alkyl group, $R_2$, $R_3$, and $R_4$ each, independently of the others, are hydrogen atoms or alkyl groups, and X is an anion; (c) those of the general formula

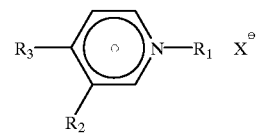

wherein $R_1$ is an alkyl group, $R_2$ and $R_3$ each, independently of the other, are hydrogen atoms or alkyl groups, and X is an anion; (d) those of the general formula

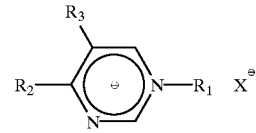

wherein $R_1$ is an alkyl group, $R_2$ and $R_3$ each, independently of the other, are hydrogen atoms or alkyl groups, and X is an anion; (e) those of the general formula

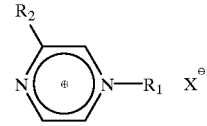

wherein $R_1$ is an alkyl group, $R_2$ is a hydrogen atom or an alkyl group, and X is an anion; (f) those of the general formula

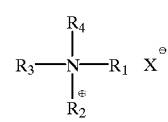

wherein $R_1$, $R_2$, $R_3$, and $R_4$ each, independently of the others, are alkyl groups, and X is an anion; (g) those of the general formula

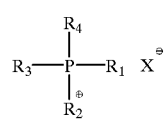
wherein $R_1$, $R_2$, $R_3$, and $R_4$ each, independently of the others, are alkyl groups, and X is an anion; and (h) mixtures thereof, wherein the anion is selected from the group consisting of tetrafluoborate, nitrate, hexafluorophosphate, perchlorate, and mixtures thereof.
* * * * *